United States Patent [19]

Musch et al.

[11] Patent Number: 4,485,216

[45] Date of Patent: Nov. 27, 1984

[54] POLYCHLOROPRENE MIXTURES AND THE USE THEREOF

[75] Inventors: Rüdiger Musch, Bergisch-Gladbach; Wilhelm Göbel, Leverkusen; Wolfgang Konter, Neuss; Eberhard Müller, Dormagen, all of Fed. Rep. of Germany

[73] Assignee: Bayer Aktiengesellschaft, Leverkusen, Fed. Rep. of Germany

[21] Appl. No.: 529,389

[22] Filed: Sep. 6, 1983

[30] Foreign Application Priority Data

Sep. 16, 1982 [DE] Fed. Rep. of Germany ....... 3234318

[51] Int. Cl.³ .................... C08L 11/00; C08L 27/22
[52] U.S. Cl. .................... 525/215; 525/194; 525/226
[58] Field of Search .................. 525/215, 194, 226

[56] References Cited

U.S. PATENT DOCUMENTS 3,147,318 9/1964 Carrcroft ............................ 525/215
3,308,087 3/1967 Garrett .............................. 525/143
3,752,785 8/1973 Smith ................................ 525/215

Primary Examiner—Jacob Ziegler
Attorney, Agent, or Firm—Connolly and Hutz

[57] ABSTRACT

Solid polychloroprene mixtures consisting of sol and gel polymer, wherein the sol component consists of a copolymer of chloroprene and from 0.75 to 0.32% by weight of sulphur, based on the total quantity of unsaturated compounds of the sol polychloroprene, and the gel component consists of a copolymer of chloroprene, from 0.4 to 1.0% by weight of sulphur, based on the total quantity of unsaturated compounds of the gel polychloroprene and from $7.5 \times 10^{-3}$ to $3.0 \times 10^{-2}$ mols, based on 100 g of the total quantity of monomer of the gel polychloroprene, of a compound corresponding to the general formula

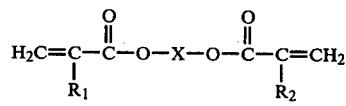

wherein $R_1$ and $R_2$ each represents a hydrogen atom or $C_1$–$C_4$ alkyl group, and X represents a $C_2$–$C_{10}$ alkylene group, are suitable for the production by extrusion and by calandering of rubber articles which may be subjected to high strains.

6 Claims, No Drawings

POLYCHLOROPRENE MIXTURES AND THE USE THEREOF

This invention relates to sulphur-modified solid chloroprene rubber mixtures having excellent storage stability, good processibility and high tensile strength, and the invention also relates to the use thereof.

It has been possible, using mixtures of pre-cross-linked polychloroprene (gel polymer) and benzene-soluble polychloroprene (sol polymer) to reduce the swelling after extrusion of polychloroprene rubbers and to improve the dimensional accuracy, stability and surface smoothness of extruded articles and calandered films. A particularly advantageous process for the production of such mixtures is described for example, in DE-AS No. 1,720,107.

However, the unsatisfactory storage stability of this polymer mixture and the reduced mechanical properties of the vulcanisates, such as the tensile strength are noticeable disadvantages.

However, if the sol and gel polymer is produced in the presence of sulphur as comonomer, then, after peptization of the latices and after working up the mixture to produce solid rubber, a product is produced which surprisingly has excellent storage stability as a polymer mixture, good processing properties, such as rapid rolled sheet formation, a low energy consumption during production as well as a good injecting ability during extrusion of the rubber mixture, a high scorch reliability and very good mechanical properties of the vulcanisates. This combination of properties cannot be achieved by mixing sol and gel polymers, as they are described in, for example DE-AS No. 1,720,107 or by the combination of sol-gel-chloroprenepolymers, in which only one of the components is a sulphur-containing chloroprene polymer.

Therefore, the present invention provides solid polychloroprene mixtures of sol and gel polymer, characterised in that the sol component consists of a copolymer of chloroprene and from 0.75 to 0.32% by weight of sulphur, based on the total quantity of unsaturated compounds of the sol polychloroprene, and up to 10% by weight of the chloroprene may be replaced by other comonomers, and the gel component consists of a copolymer of chloroprene, from 0.4 to 1.0% by weight of sulphur, based on the total quantity of unsaturated compounds of the gel polychloroprene and from $7.5 \times 10^{-3}$ to $3.0 \times 10^{-2}$ mols, based on 100 g of the total quantity of monomer of the gel polychloroprene, of a compound corresponding to the general formula:

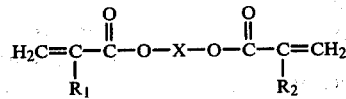

wherein $R_1$ and $R_2$ each represents a hydrogen atom or a $C_1$–$C_4$ alkyl groups, and X represents a $C_2$–$C_{10}$ alkylene group, wherein up to 10% by weight of the chloroprene may be replaced by other comonomers.

1-Chloroprene, styrene, 2,3-dichlorobutadiene and acrylonitrile are particularly included as other comonomers of the sol polymer and of the gel polymer.

The solid polychloroprene mixtures are produced by mixing the components which are present at latex, and optionally by adding substances which improve the storage stability of the polymer, such as tetra-ethylthiuramdisulphide (TETD), following which coagulation takes place.

The mixtures preferably contain the sol and gel components in a ratio of from 9:1 to 4:6.

A preferred diester is ethylene glycol dimethacrylate. After peptization, the gel polymer is to have a swelling index in toluene of from 10 to 90, preferably from 20 to 60.

The polymerisation of the two components may take place continuously or discontinuously, a continuous production method being preferred.

Polymerisation and peptization of the sol component takes place according to, for example, DE-OS No. 1,807,298 or DE-OS No. 2,755,074.

Polymerisation of the sulphur-containing gel component takes place according to, for example, DE-OS No. 3,120,992 or DE-OS No. 3,123,905. The polymerisation is stopped and the polymer peptized according to, for example DE-OS No. 2,755,074. The term "peptization" is understood in the present context as designating the cleavage of the polymer chain at its sulphur segments. The peptization agent, TETD, which is frequently used may be combined with nucleophilic acting substances, such as amines or dithiocarbamate (DE-OS No. 2,018,736; DE-AS No. 1,230,204). The latex which is obtained after polymerisation is usually peptized at a temperature of from 30° to 70° C. The peptization rate depends on, among other factors, the quantity of peptization agent, on the type and quantity of the nucleophilic substance, on the temperature and on the pH of the latex. The polymer may be decomposed in the latex or on the solid crude polymer, for example according to freeze coagulation of the latex.

Depending on the peptization conditions, the sulphur bridges in the polychloroprene network are dissolved, as a result of which the network density which is visible in an increasing swelling index, is reduced.

The latex mixture may be worked up, for example, by freeze coagulation as described in DE-OS No. 2,645,921.

The polychloroprene mixtures according to the present invention are particularly suitable for the production of rubber articles which may be subjected to a high mechanical strain, such as V-belts and conveyor belts, and these may be produced by extrusion, by calandering and by stamping.

EXAMPLE 1

Production of sol polymer latex I 970 g of chloroprene and 30 g of 2,3-dichlorobutadiene are emulsified in 1500 g of water to which are added 55 g of disproportionated resin acid (solids content 70%), 5 g of sodium salt of a naphthalenesulphonic acid-formaldehyde condensation product, 5 g of sodium hydroxide, 3 g of anhydrous sodium pyrophosphate, 5 g of triisopropanolamine and 12 g of sulphur dispersion (50%).

10 g of potassium persulphate and 0.2 g of sodium-$\beta$-anthraquinone sulphonate, dissolved in 490 g of water are prepared as catalyst solution.

The emulsion is flushed with nitrogen, heated to 50° C. and polymerisation started by adding the catalyst solution. During polymerisation, more catalyst solution is metered in such that the temperature of the mixture does not exceed 50° C. After a monomer conversion of 65%, polymerisation is stopped with 1 g of phenothazine and the excess monomer is separated under reduced pressure by steam distillation. The latex is mixed with 6.5 g of TETD (22% by weight emulsion) and is peptized for 3 hours at 40° C.

EXAMPLE 2

Production of sol polymer latex II

The process is carried out as described in Example 1, except that the 2,3-dichlorobutadiene is replaced by chloroprene.

EXAMPLE 3

Production of sol polymer latex III (Comparative Example)

1000 g of chloroprene are emulsified together with 2.5 g of n-dodecylmercaptan in 1300 g of water, to which are added 55 g of disproportionated resin acid (solids content 70%), 7 g of the sodium salt of a naphthalene-sulphonic acid-formaldehyde condensation product and 7 g of sodium hydroxide.

32 ml of a 3% aqueous formamidine sulphinic acid solution are allowed to continuously run in as catalyst solution. The emulsion is flushed with nitrogen, heated to 40° C. and polymerisation started by adding the catalyst solution. During polymerisation, more catalyst solution is metered in such that the temperature of the mixture does not exceed 45° C. After a monomer conversion of 65%, polymerisation is stopped with 1 g of phenothiazine and the excess monomer is separated under reduced pressure by steam distillation.

EXAMPLE 4

Production of sulphur-containing gel polymer latex I 970 g of chloroprene and 30 g of ethylene glycol dimethacrylate are emulsified in 1500 g of water, to which are added 55 g of disproportionated resin acid (solids content 70%), 6 g of the sodium salt of a naphthalenesulphonic acid-formaldehyde condensation product, 3 g of sodium hydroxide, 5 g of anhydrous sodium pyrophosphate, 5 g of triisopropanolamine and from 10 to 18 g of a sulphur dispersion (50%).

10 g of potassium persulphate and 0.2 g of sodium-$\beta$-anthraquinone sulphate, dissolved in 490 g of water are prepared as the catalyst solution.

Polymerisation is carried out as described in Example 1 up to a monomer conversion of 78%, and the latex which is degassed and stopped with 7 g of tetraethylthiuramdisulphide is peptized with 4.2 g of dibutyldithiocarbamate, dissolved in water, for 3 hours at 40° C.

EXAMPLE 5

Production of sulphur-containing gel polymer latex II

The process is carried out as described in Example 4, except that 960 g of chloroprene and 40 g of ethylene glycol dimethacrylate are used.

EXAMPLE 6

Production of gel polymer latex III (Comparative Example)

950 g of 2-chloroprene are emulsified together with 50 g of ethylene glycol dimethacrylate and 3 g of n-dodecylmercaptan in 1300 g of water, to which are added 60 g of disproportionated resin acid (solids content 70%), 4 g of sodium salt of a naphthalenesulphonic acid-formaldehyde condensation product and 4 g of sodium hydroxide.

Polymerisation is carried out in analogous manner to Example 3 up to a conversion of 78%.

Compilation of the polymer mixtures, numbers in parts by weight (solid based on solid). Except for Examples 7 and 8, all the latex mixtures are mixed with 1.5% by weight of TETD, based on polymer solids, before processing.

| Example | 7[1] | 8[1] | 9[1] | 10 | 11 | 12 | 13 | 14 | 15 | 16 | 17 | 18 | 19 | 20 | 21 |
|---|---|---|---|---|---|---|---|---|---|---|---|---|---|---|---|
| Sol latex I | | | 80 | | | | | 80 | 90 | 80 | 70 | 60 | 80 | 80 | 80 |
| Sol latex II | | | | 80 | 50 | 80 | 50 | | | | | | | | |
| Sol latex III | 80 | 50 | | | | | | | | | | | | | |
| Gel latex I | | | | 20[3] | 50[3] | | | 20[3] | 10[2] | 20[2] | 30[2] | 40[2] | 20[2] | 20[4] | 20[5] |
| Gel latex II | | | | | | 20 | 50 | | | | | | | | |
| Gel latex III | 20 | 50 | 20 | | | | | | | | | | | | |

[1] = Comparative Example
[2] = Contains 0.9 parts of sulphur
[3] = Contains 0.8 parts of sulphur
[4] = Contains 0.7 parts of sulphur
[5] = Contains 0.5 parts of sulphur

EXAMPLE 22

Storage stability and mastication

Storage stability:

After the latex mixtures have been processed into rubber, the Mooney viscosity of the samples is determined according to DIN 53 523; ML 4 (100° C.). In order to determine the viscosity stability, the samples are stored for 3 days at 70° C. and the viscosity is re-determined. The more stable the products, the lower the viscosity difference ($\Delta$ML) between the two measurements.

Mastication test 800 g of polymer are squeezed twice through a 0.4 mm roller gap on a rolling mill (200×390 mm) at 40° C. roller temperature and with a friction of 1:1.2. 200 g thereof are then weighed twice and masticated over a period of from 0 to 8 minutes with the same roller gap. The end value which is achieved, in addition to the viscosity difference is used for the assessment.

| Polymer from Example | 10 | 11 | 12 | 13 | 7[1] | 8[1] |
|---|---|---|---|---|---|---|
| ML-4 (ME) | 47 | 52 | 50 | 48 | 52 | 50 |
| ML-4 (ME 3 days 70° C.) | 44 | 49 | 49 | 48 | 62 | 62 |
| $\Delta$ML | −3 | −3 | −1 | ±0 | +10 | +12 |
| Decomposition by mastication | | | | | | |
| (ME) | 33 | 36 | 36 | 32 | 44 | 43 |

| Polymer from Example | 10 | 11 | 12 | 13 | 7[1] | 8[1] |
|---|---|---|---|---|---|---|
| Decomposition in % | 30 | 31 | 28 | 33 | 15 | 14 |

[1]Comparative Example

Compared to conventional types of gel, the gels according to the present invention exhibit a high mastication effect which is very advantageous for the processing behaviour, and they only exhibit a small viscosity change during the heat storage, which is equivalent to a high storage stability.

EXAMPLE 23

Processing and vulcanisate properties

Scorch time ($MS_5$) min. at 120° C.:

A test mixture produced according to 150 specifications 2475-1975 E is vulcanised in a shearing disc plastometer according to Mooney (DIN 53 523) at 120° C. The time span from the start of measuring up to the plasticity increase by 5 Mooney units over the plasticity minimum is specified (in min.) as the prevulcanisation time (scorch).

Vulcanisation time at 150° C.:

A test mixture produced according to ISO specifications 2475-1975 E is vulcanised in a shearing vulcameter according to DIN 53 529 at 150° C. The reaction time $t_R$ in minutes which results from the difference of the times at 80% ($t_{80}$) and 10% ($t_{10}$) conversion with respect to the cross-linking density which may be achieved, is recorded.

Vulcanisation strength:

A polymer-carbon black mixture according to ISO standard 2475 1975 E is vulcanised at 150° C. in three stages (20, 40, 60 min.). The strength of the corresponding samples is determined according to DIN 53 455. In each case, the average value of the three stages is stated.

| Polymer from Example | 10 | 11 | 12 | 13 | 7 | 8[1] |
|---|---|---|---|---|---|---|
| $MS_5$ (min) | 21 | 20 | 22 | 25 | 8 | 8 |
| Reaction time (min) | 8.2 | 9.0 | 8.4 | 9.8 | 17.5 | 16.0 |
| Vulcanisation strength (MPa) | 19.6 | 19.4 | 19.5 | 19.1 | 18.5 | 16.3 |

[1]Comparative Example

As may be seen, the polymer mixtures according to the present invention (numbers 10 to 13) have clearly longer scorch times, i.e., a higher processing reliability, shorter reaction times and a higher vulcanisation strength, even in the case of high gel quantities (numbers 11 and 13) compared to the Comparative product (number 8).

EXAMPLE 24

Extrusion behaviour of the rubber mixture

| Test mixture | | |
|---|---|---|
| Polymer | 100 | parts by weight |
| Carbon black N 990 | 25 | " |
| Carbon black N 539 | 25 | " |
| Aromatic mineral oil | 15 | " |
| α-naphthylamine | 2 | " |
| Stearic acid | 1 | " |
| Ozone protective agent | 1 | " |
| Magnesium oxide | 4 | " |

According to this formulation, a total mixture amounting to 1.2 kg is mixed in a 1 liter kneader at 30° C. and at 30 r.p.m. 300 g of this test mixture are injected to form a Garvey profile according to ASTM-D 2230-78 as an 8 mm wide and a 2 mm thick strip by means of a Brabender laboratory extruder (10-D screw) at a temperature of from 70° (cylinder) to 90° C. (injection head), and the swelling after extrusion (in %) and the extrusion velocity (cm/sec) is determined therefrom.

500 g of the test mixture are allowed to revolve as a sheet on a rolling mill (320×200 mm) at 30° C., 20 r.p.m. and with a roller gap of 0.9 mm. Two strips having dimensions of 5×50 cm are cut out of the sheet and are left on a small talcum-covered support. After 24 hours, the length is measured and the average from both samples is stated as the shrinkage (in %).

| Polymer from Example | 10 | 12 | 7[1] |
|---|---|---|---|
| Swelling after extrusion (%) | 45.0 | 45.0 | 46.5 |
| Extrusion velocity (cm/sec) | 2.20 | 2.24 | 2.10 |
| Shrinkage (%) | 42 | 40 | 48 |

[1]Comparative Example

EXAMPLE 25

Comparison of polymer mixtures having sulphur-containing and sulphur-free gel parts The processing and vulcanisate properties are determined according to Example 23.

| Polymer from Example | 9[1] | 14 |
|---|---|---|
| ML-4 (ME) | 60 | 60 |
| $MS_5$ (min) | 24 | 36 |
| Reaction time (min) | 12.2 | 10.4 |
| Vulcanisation strength (MPa) | 18.6 | 19.4 |
| Hardness (Shore A) | 59 | 63 |
| Elasticity (%) | 45 | 48 |

[1]Comparative Example

Compared to Example 9 in which only one polymer component contains sulphur, Example 14 according to the present invention exhibits a clearly higher scorch reliability, a faster reaction time and more favourable vulcanisate values.

EXAMPLE 26

Influence of the gel proportion and of the sulphur content of the gel component on the raw material- and vulcanisate properties of the polymer mixtures The storage stability and the processing and vulcanisate properties are determined, as described in Examples 22 and 23, the test mixtures being produced according to ISO 2475-1975 E without thiourea accelerators.

| Polymer from Example | 15 | 16 | 17 | 18 | 19 | 20 | 21 |
|---|---|---|---|---|---|---|---|
| ML-4 (ME) | 37 | 37 | 36 | 36 | 35 | 37 | 38 |
| ML-4 (3 days 70° C.) (ME) | 36 | 36 | 36 | 36 | 34 | 37 | 39 |
| $MS_5$ (min) | 45 | 42 | 42 | 40 | 42 | 39 | 39 |
| Vulcanisate strength (MPa) | 19.3 | 19.2 | 19.4 | 19.6 | 19.2 | 19.6 | 20.1 |
| Hardness (Shore A) | 65 | 65 | 65 | 65 | 65 | 64 | 64 |
| Elasticity (%) | 48 | 48 | 48 | 48 | 49 | 49 | 49 |

As may be seen, the storage stability and the processing behaviour is independent of the gel content or of the sulphur content of the gel component. In contrast to the hitherto conventional decrease in the vulcanisate strength with an increasing gel content in the polymer mixture, in this case, the strength is independent thereof.

We claim:

1. Solid polychloroprene mixtures of peptized sol and gel polymer, characterised in that the sol component consists of copolymer of chloroprene and from 0.75 to 0.32% by weight of sulphur, based on the toal quantity of unsaturated compounds of the sol polychloroprene, and up to 10% by weight of the chloroprene may be replaced by other comonomers, and the gel component consists of a copolymer of chloroprene, from 0.4 to 1.0% by weight of sulphur, based on the total quantity of unsaturated compounds of the gel polychloroprene, and from $7.5 \times 10^{-3}$ to $3.0 \times 10^{-2}$ mols, based on 100 g of the total quantity of monomer of the gel polychloroprene, of a compound corresponding to the general formula

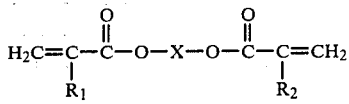

wherein $R_1$ and $R_2$ represent hydrogen or $C_1$–$C_4$ alkyl, and X represents $C_2$–$C_{10}$ alkylene, and up to 10% by weight of the chloroprene may be replaced by other comonomers.

2. Solid polychloroprene mixtures according to claim 1, wherein $R_1$ and $R_2$ represent methyl and X represents ethylene.

3. Solid polychloroprene mixtures according to claim 1, wherein the other comonomers are 1-chloro-1,3-butadiene, styrene, 2,3-dichlorobutadiene or acrylonitrile.

4. Solid polychloroprene mixtures according to claim 1, characterised in that they contain the sol component and the gel component in a ratio of from 9:1 to 4:6.

5. Solid polychloroprene mixtures according to claim 1, characterised in that after peptization, the gel polymer has a swelling index in toluene of from 10 to 90, preferably from 20 to 60.

6. Rubber articles comprising the solid chloroprene mixtures of claim 1.

* * * * *